(12) United States Patent
Newstadt et al.

(10) Patent No.: US 8,959,235 B1
(45) Date of Patent: Feb. 17, 2015

(54) TECHNIQUES FOR DETERMINING AN OPTIMAL CONNECTION DURATION FOR A CONNECTION BETWEEN A CLIENT AND A SERVER ACROSS A NETWORK

(75) Inventors: Keith Newstadt, Newton, MA (US); Michael Shavell, Hudson, NH (US)

(73) Assignee: Symantec Corporation, Mountain View, CA (US)

( * ) Notice: Subject to any disclaimer, the term of this patent is extended or adjusted under 35 U.S.C. 154(b) by 561 days.

(21) Appl. No.: 13/176,001

(22) Filed: Jul. 5, 2011

(51) Int. Cl.
*G06F 15/16* (2006.01)

(52) U.S. Cl.
USPC ............................... 709/227; 709/228

(58) Field of Classification Search
USPC .................................. 709/227, 228
See application file for complete search history.

(56) References Cited

U.S. PATENT DOCUMENTS

| | | | | |
|---|---|---|---|---|
| 7,729,273 B2* | 6/2010 | Knapik et al. | | 370/252 |
| 7,729,357 B2* | 6/2010 | Strater et al. | | 370/395.4 |
| 7,813,337 B2* | 10/2010 | Akyol et al. | | 370/388 |
| 7,921,208 B2* | 4/2011 | Hochwarth et al. | | 709/225 |
| 8,244,865 B2* | 8/2012 | Burke et al. | | 709/226 |
| 2003/0088677 A1* | 5/2003 | Yamamoto | | 709/227 |
| 2007/0291658 A1* | 12/2007 | Knapik et al. | | 370/252 |
| 2008/0159318 A1* | 7/2008 | Pierlot et al. | | 370/412 |
| 2008/0263460 A1* | 10/2008 | Altberg et al. | | 715/757 |
| 2010/0042869 A1* | 2/2010 | Szabo et al. | | 714/4 |
| 2011/0044344 A1* | 2/2011 | Hudson et al. | | 370/395.53 |
| 2011/0106940 A1* | 5/2011 | Chauvin et al. | | 709/224 |
| 2012/0124217 A1* | 5/2012 | Bartley et al. | | 709/227 |
| 2012/0331087 A1* | 12/2012 | Luna et al. | | 709/213 |

* cited by examiner

*Primary Examiner* — Thanh Tammy Nguyen
*Assistant Examiner* — Jonathan Bui
(74) *Attorney, Agent, or Firm* — Wilmer Cutler Pickering Hale and Dorr LLP (57) ABSTRACT

Techniques for determining an optimal connection duration for a connection between a client device and a server across a network are disclosed. In one particular embodiment, the techniques may be realized as a method for determining an optimal connection duration for a connection between a client device and a server across a network comprising: identifying, using the client device, a network access point that communicatively couples the client device to a network; selecting a sever connection time period; initiating the connection between the client device and the server via the network based on the sever connection time period; determining whether a sever connection notification was received from the server within the sever connection time period; and adjusting the sever connection time period based on the determination.

20 Claims, 6 Drawing Sheets

TECHNIQUES FOR DETERMINING AN OPTIMAL CONNECTION DURATION FOR A CONNECTION BETWEEN A CLIENT AND A SERVER ACROSS A NETWORK

FIELD OF THE DISCLOSURE

The present disclosure relates generally to persistent network connections and, more particularly, to techniques for determining an optimal connection duration for a connection between a client and a server across a network.

BACKGROUND OF THE DISCLOSURE

Most modern remote management solutions attempt to maintain persistent network connections between management servers and managed endpoints (e.g., client devices). Ideally, these persistent network connections would remain live indefinitely. Unfortunately, many network devices (e.g., firewalls) located between the management servers and managed endpoints frequently terminate such network connections for various reasons. For example, a network device may terminate a network connection between a management server and a managed endpoint based on a determination that the machines have been connected and silent (e.g., sending low or no traffic) for too long. As a result, many managed endpoints resort to using inefficient polling mechanisms to maintain a live, persistent network connection.

In view of the foregoing, it may be understood that there may be significant problems and shortcomings associated with current network connection technologies.

SUMMARY OF THE DISCLOSURE

Techniques for determining an optimal connection duration for a connection between a client and a server across a network are disclosed. In one particular embodiment, the techniques may be realized as a method for determining an optimal connection duration for a connection between a client device and a server across a network comprising: identifying, using the client device, a network access point that communicatively couples the client device to a network; selecting a sever connection time period; initiating the connection between the client device and the server via the network based on the sever connection time period; determining whether a sever connection notification was received from the server within the sever connection time period; and adjusting the sever connection time period based on the determination.

In accordance with other aspects of this particular embodiment, identifying the network access point may include identifying a Media Access Control (MAC) address associated with the network access point.

In accordance with further aspects of this particular embodiment, the sever connection time period may indicate an amount of time the server should wait before gracefully severing the connection between the client device and the server.

In accordance with additional aspects of this particular embodiment, initiating the connection between the client device and the server may include transmitting the sever connection time period to the server via the network.

In accordance with other aspects of this particular embodiment, the sever connection notification may be configured to notify the client device that the server is preparing to sever the connection between the client device and the server.

In accordance with further aspects of this particular embodiment, the sever connection notification may be configured to instruct the client device to initiate a new connection between the client device and the server.

In accordance with additional aspects of this particular embodiment, whether the sever connection notification was received within a total time period that comprises a sum of the sever connection time period and a threshold time period may be determined.

In accordance with other aspects of this particular embodiment, adjusting the sever connection time period may include increasing the sever connection time period based on the determination that the sever connection notification was received from the server within the sever connection time period.

In accordance with further aspects of this particular embodiment, adjusting the sever connection time period may include decreasing the sever connection time period based on the determination that the sever connection notification was not received from the server within the sever connection time period.

In accordance with additional aspects of this particular embodiment, the sever connection time period may be adjusted until the optimal connection duration is determined.

In accordance with other aspects of this particular embodiment, a keep alive frequency may be selected.

In accordance with further aspects of this particular embodiment, one or more keep alive messages may be transmitted based on the keep alive frequency.

In accordance with additional aspects of this particular embodiment, the keep alive frequency may be adjusted until an optimal keep alive frequency is determined.

In another particular exemplary embodiment, the techniques may be realized as an article of manufacture for determining an optimal connection duration for a connection between a client device and a server across a network, the article of manufacture comprising: at least one non-transitory processor readable medium; and instructions stored on the at least one medium; wherein the instructions are configured to be readable from the at least one medium by at least one processor and thereby cause the at least one processor to operate so as to: identify a network access point that communicatively couples the client device to a network; select a sever connection time period; initiate the connection between the client device and the server via the network based on the sever connection time period; determine whether a sever connection notification was received from the server within the sever connection time period; and adjust the sever connection time period based on the determination.

In another particular exemplary embodiment, the techniques may be realized as a system for determining an optimal connection duration for a connection between a client device and a server across a network comprising: one or more processors communicatively coupled to a network, wherein the one or more processors are configured to: identify a network access point that communicatively couples the client device to a network; select a sever connection time period; initiate the connection between the client device and the server via the network based on the sever connection time period; determine whether a sever connection notification was received from the server within the sever connection time period; and adjust the sever connection time period based on the determination.

In accordance with other aspects of this particular embodiment, the one or more processors may be configured to identify the network access point by identifying a MAC address associated with the network access point.

In accordance with further aspects of this particular embodiment, the sever connection time period may indicate an amount of time the server should wait before gracefully severing the connection between the client device and the server.

In accordance with additional aspects of this particular embodiment, the one or more processors may be configured to initiate the connection between the client device and the server by transmitting the sever connection time period to the server via the network.

In accordance with other aspects of this particular embodiment, the one or more processors may be configured to adjust the sever connection time period by increasing the sever connection time period based on the determination that the sever connection notification was received from the server within the sever connection time period.

In accordance with further aspects of this particular embodiment, the one or more processors may be configured to adjust the sever connection time period by decreasing the sever connection time period based on the determination that the sever connection notification was not received from the server within the sever connection time period.

The present disclosure will now be described in more detail with reference to embodiments thereof as shown in the accompanying drawings. While the present disclosure is described below with reference to embodiments, it should be understood that the present disclosure is not limited thereto. Those of ordinary skill in the art having access to the teachings herein will recognize additional implementations, modifications, and embodiments, as well as other fields of use, which are within the scope of the present disclosure as described herein, and with respect to which the present disclosure may be of significant utility.

BRIEF DESCRIPTION OF THE DRAWINGS

In order to facilitate a fuller understanding of the present disclosure, reference is now made to the accompanying drawings, in which like elements are referenced with like numerals. These drawings should not be construed as limiting the present disclosure, but are intended to be illustrative only.

DETAILED DESCRIPTION OF EMBODIMENTS

Currently, modern remote management solutions may attempt to maintain persistent network connections between management servers (e.g., servers) and managed endpoints (e.g., client devices) in order to provide the management servers with immediate access to the managed endpoints. Many network devices (e.g., firewalls) located between these management servers and managed endpoints, however, may frequently terminate such network connections without warning or notification (e.g., ungracefully). For example, a network device may terminate a network connection between a management server and a managed endpoint based on a determination that the machines have been connected and silent (e.g., sending low or no traffic) for too long. In another example, a network device may terminate a network connection between a management server and a managed endpoint to conserve the network device's memory.

As a result, many managed endpoints may be configured to use polling mechanisms (e.g., regular reconnections, keep alive requests) to maintain a live, persistent network connection to a management server. Such polling mechanisms, however, create a substantial amount of unnecessary traffic that consumes Central Processing Unit (CPU) resources and bandwidth resources. Furthermore, these polling mechanisms may introduce latency between the management server and the managed endpoint. For example, if the managed endpoint polls every 10 minutes, then it could take up to 10 minutes before the management server can successfully initiate a conversation with the managed endpoint in the case of a terminated connection.

In one embodiment, certain techniques for determining an optimal connection duration for a connection between a client and a server across a network are provided. In such an embodiment, a connection duration system may operate on a client device to enable the client device to determine an optimal connection duration, an optimal keep alive frequency, or a combination of both. The optimal connection duration may indicate the greatest amount of time that the client device can assume that a connection between the client device and a server on a particular network is still live. The optimal keep alive frequency may indicate the lowest frequency at which the client device can transmit a keep alive message in order to maintain a live connection between the client device and a server on a particular network.

When a client device is initially connected to a network, the connection duration system may identify the Media Access Control (MAC) address of the network access point associated with the network. Based on the identified MAC address, the connection duration system may determine whether an optimal connection duration or an optimal keep alive frequency has been previously determined for the network. For example, the connection duration system may access a storage mechanism (e.g., memory) located on the client device to determine whether the identified MAC address is associated with an optimal connection duration or an optimal keep alive frequency that was previously determined by the client device. If, for example, the MAC address is associated with an optimal connection duration or an optimal keep alive frequency that were previously determined, the connection duration system may use the previously determined optimal connection duration or optimal keep alive frequency to maintain a live, persistent connection between the client device and a server across the network. If, however, the MAC address is not associated with an optimal connection duration or an optimal keep alive frequency that were previously determined, the connection duration system may initiate a process to determine an optimal connection duration, an optimal keep alive frequency, or a combination of both.

In one embodiment, the connection duration system may determine an optimal connection duration by selecting a sever connection time period (e.g., an initial sever connection time period). A sever connection time period may indicate an amount of time a server should wait before gracefully severing a connection between a client device and the server. For example, the connection duration system may select an initial sever connection time period of 6 hours. The connection duration system may then initiate a connection with a server across the network based on the selected sever connection time period. That is, the connection duration system may initiate the connection with the server and transmit the selected sever connection time period to the server across the network.

The connection duration system may then determine whether a sever connection notification was received from the server within the sever connection time period. In one embodiment, a sever connection notification may include a notification to the client device that the server is preparing to sever the connection between the client device and the server. In another embodiment, a sever connection notification may include an instruction to the client device to initiate a new connection between the client device and the server.

If, for example, the connection duration system determines that a sever connection notification was received from the server within the sever connection time period (i.e., the connection is still live), the client device may increase the sever connection time period (e.g., increase the sever connection time period from 6 hours to 9 hours) and initiate a new connection between the client device and the server. If, however, the connection duration system determines that a sever connection notification was not received from the server within the sever connection time period (i.e., the connection is not still live), the client device may decrease the sever connection time period (e.g., decrease the sever connection time period from 6 hours to 3 hours) and initiate a new connection between the client device and the server. The client device may continue adjusting the sever connection time period (e.g., by increasing and decreasing the sever connection time period) until the optimal connection duration is determined.

In another embodiment, the connection duration system may determine an optimal keep alive frequency by selecting an initial keep alive frequency (e.g., 30 minutes). The connection duration system may then transmit one or more keep alive messages based on the selected keep alive frequency. The connection duration system may then determine whether a sever connection notification was received from the server within the sever connection time period. If, for example, the connection duration system receives a sever connection notification within the sever connection time period (i.e., the connection is still live), the client device may decrease the keep alive frequency (e.g., decrease the keep alive frequency from 30 minutes to 1 hour) and initiate a new connection between the client device and the server. If, however, the connection duration system does not receive a sever connection notification within the sever connection time period (i.e., the connection is not still live), the client device may increase the keep alive frequency (e.g., increase the keep alive frequency from 30 minutes to 15 minutes) and initiate a new connection between the client device and the server. The client device may continue adjusting the keep alive frequency until the optimal keep alive frequency is determined. Based on the optimal connection duration, optimal keep alive frequency, or a combination of both, the connection duration system may maintain the appearance of an indefinitely persistent connection by initiating a new connection with a server at the end of the optimal connection duration.

Figure 1:
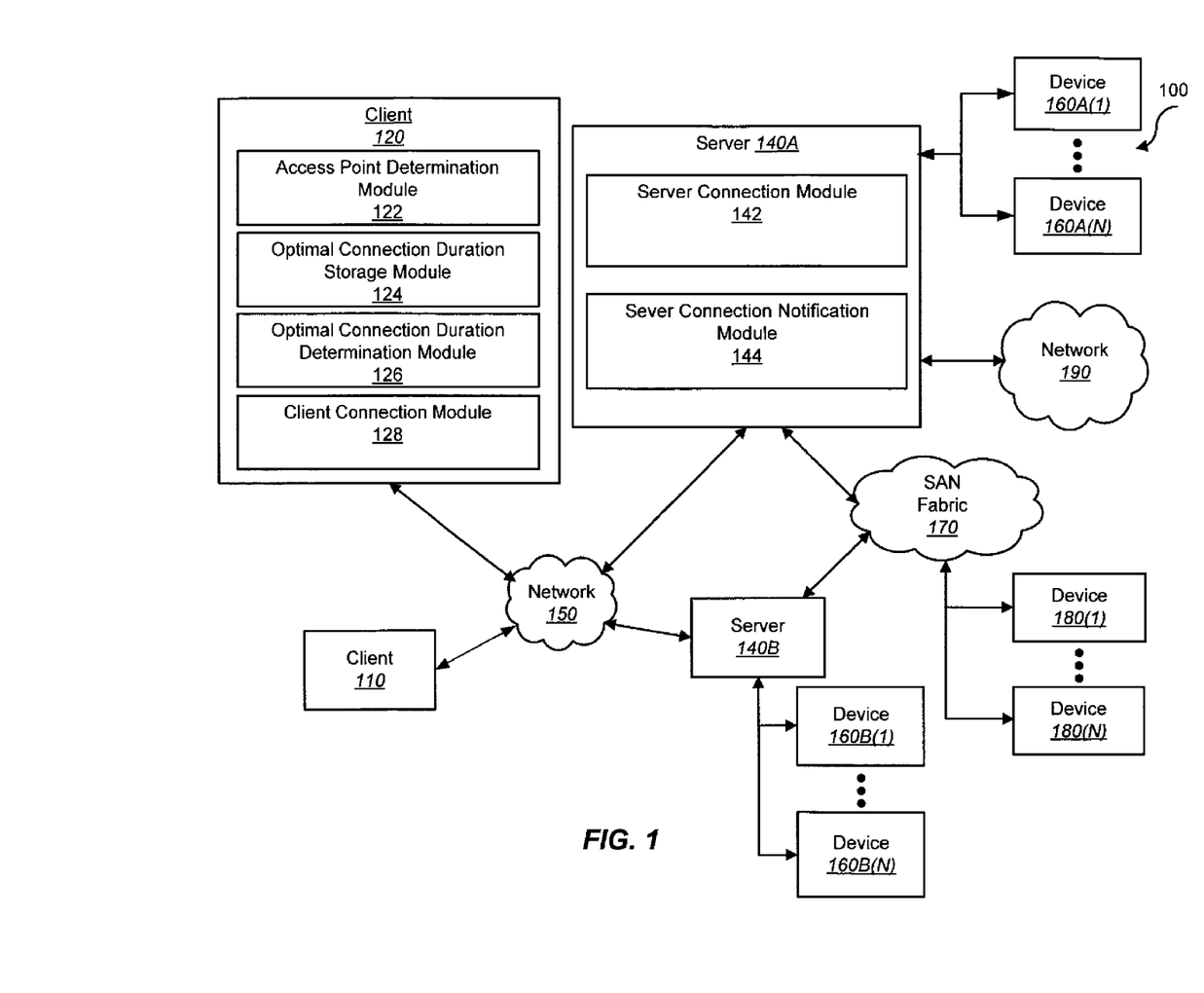
FIG. 1 shows a block diagram depicting a network architecture containing a platform for determining an optimal connection duration for a connection between a client and a server across a network in accordance with an embodiment of the present disclosure.

FIG. 1 shows a block diagram depicting a network architecture 100 containing a platform for determining an optimal connection duration for a connection between a client and a server across a network in accordance with an embodiment of the present disclosure. FIG. 1 is a simplified view of network architecture 100, which may include additional elements that are not depicted. Network architecture 100 may contain client 110, client 120, server 140A, as well as server 140B (one or more of which may be implemented using computer system 200 shown in FIG. 2). Client 110, client 120, server 140A, and server 140B may be communicatively coupled to a network 150. Server 140A may be communicatively coupled to storage devices 160A(1)-(N), and server 140B may be communicatively coupled to storage devices 160B(1)-(N). Server 140A may contain one or more modules for determining an optimal connection duration for a connection between a client and a server across a network including a server connection module 142 and a sever connection notification module 144. Server 140A and server 140B may be communicatively coupled to a SAN (Storage Area Network) fabric 170. SAN fabric 170 may support access to storage devices 180(1)-(N) by server 140A and server 140B, and by client 110 and client 120 via network 150. Server 140A may be communicatively coupled to network 190. Client 120 may contain one or more modules for determining an optimal connection duration for a connection between a client and a server across a network including an access point determination module 122, an optimal connection duration storage module 124, an optimal connection duration determination module 126, and a client connection module 128.

Figure 2:
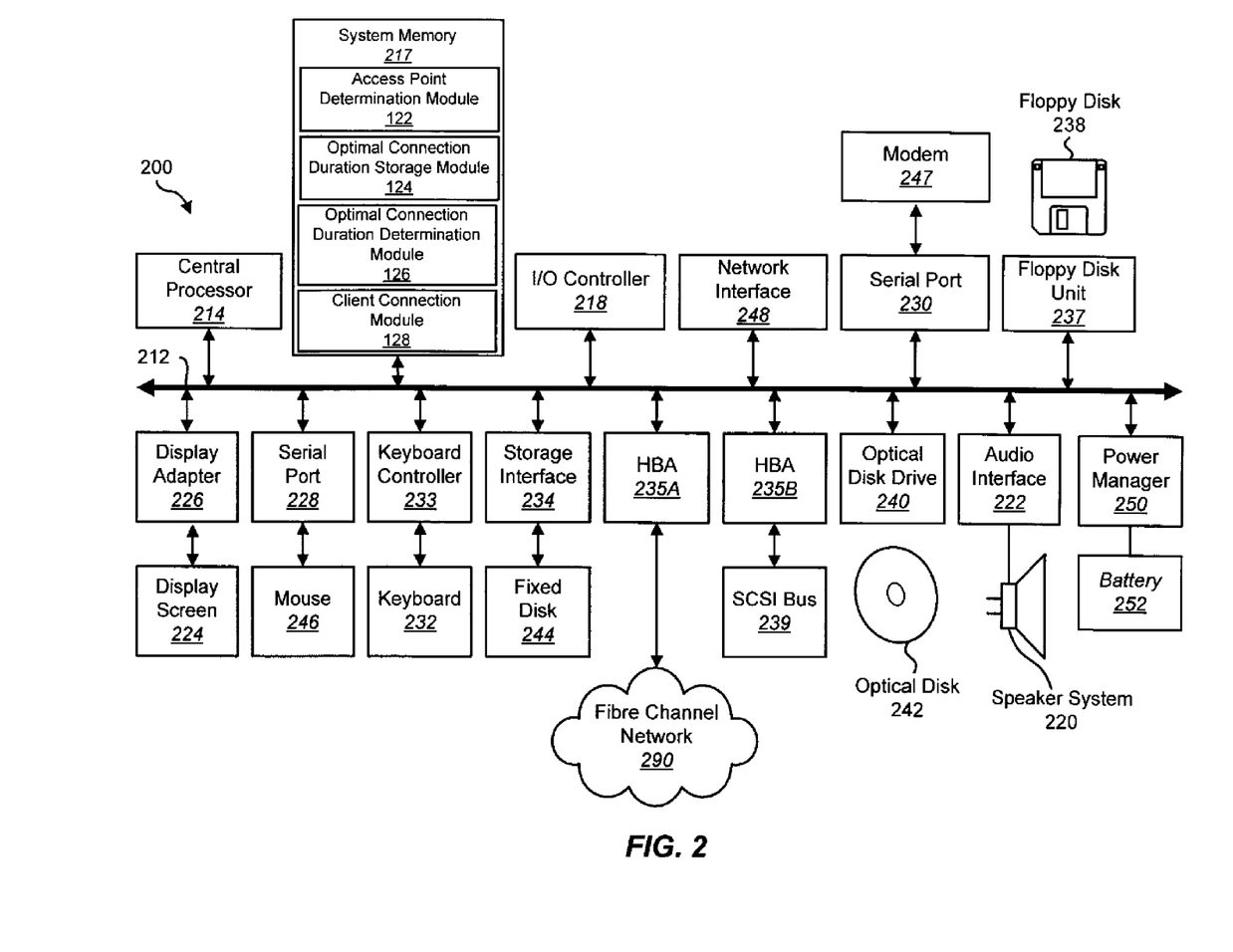
FIG. 2 depicts a block diagram of a computer system in accordance with an embodiment of the present disclosure.

With reference to computer system 200 of FIG. 2, modem 247, network interface 248, or some other method may be used to provide connectivity from one or more of client 110 and client 120 to network 150. Client 120 may be able to access information on server 140A or server 140B using, for example, a web browser or other client software. Such a client may allow client 120 to access data hosted by server 140A or server 140B or one of storage devices 160A(1)-(N), 160B(1)-(N), and/or 180(1)-(N).

Networks 150 and 190 may be local area networks (LANs), wide area networks (WANs), the Internet, cellular networks, satellite networks, or other networks that permit communication between client 110, client 120, server 140A, server 140B, and other devices communicatively coupled to networks 150 and 190. Networks 150 and 190 may further include one, or any number, of the types of networks mentioned above operating as a stand-alone network or in cooperation with each other. Networks 150 and 190 may utilize one or more protocols of one or more clients or servers to which they are communicatively coupled. Networks 150 and 190 may translate to or from other protocols to one or more protocols of network devices. Although networks 150 and 190 are each depicted as one network, it should be appreciated that according to one or more embodiments, networks 150 and 190 may each comprise a plurality of interconnected networks.

Storage devices 160A(1)-(N), 160B(1)-(N), and/or 180(1)-(N) may be network accessible storage and may be local, remote, or a combination thereof to client 110, client 120, server 140A, or server 140B. Storage devices 160A(1)-(N), 160B(1)-(N), and/or 180(1)-(N) may utilize a redundant array of inexpensive disks ("RAID"), magnetic tape, disk, a storage area network ("SAN"), an internet small computer systems interface ("iSCSI") SAN, a Fibre Channel SAN, a common Internet File System ("CIFS"), network attached storage ("NAS"), a network file system ("NFS"), optical based storage, or other computer accessible storage. Storage devices 160A(1)-(N), 160B(1)-(N), and/or 180(1)-(N) may be used for backup, replication, or archival purposes.

According to some embodiments, client 110 and client 120 may be a smartphone, PDA, desktop computer, a laptop computer, a server, another computer, or another device coupled via a wireless or wired connection to network 150. Client 110 and client 120 may receive data from user input, a database, a file, a web service, and/or an application programming interface.

Server 140A and server 140B may be web servers, application servers, archival platforms, backup servers, backend servers, network storage devices, media servers, email servers, document management platforms, enterprise search servers, or other devices communicatively coupled to network 150. Server 140A and server 140B may utilize one of storage devices 160A(1)-(N), 160B(1)-(N), and/or 180(1)-(N) for the storage of application data, replication data, backup data, or other data. Server 140A and server 140B may be hosts, such as an application server, which may process data traveling between client 110 and client 120 and a backup platform, a backup process, and/or storage. According to some embodiments, server 140A and server 140B may be platforms used for backing up and/or archiving data.

Access point determination module 122, optimal connection duration storage module 124, optimal connection duration determination module 126, client connection module 128, server connection module 142, and sever connection notification module 144 are discussed in further detail below.

FIG. 2 depicts a block diagram of a computer system 200 in accordance with an embodiment of the present disclosure. Computer system 200 is suitable for implementing techniques in accordance with the present disclosure. Computer system 200 may include a bus 212 which may interconnect major subsystems of computer system 200, such as a central processor 214, a system memory 217 (e.g. RAM (Random Access Memory), ROM (Read Only Memory), flash RAM, or the like), an Input/Output (I/O) controller 218, an external audio device, such as a speaker system 220 via an audio output interface 222, an external device, such as a display screen 224 via display adapter 226, serial ports 228 and 230, a keyboard 232 (interfaced via a keyboard controller 233), a storage interface 234, a floppy disk drive 237 operative to receive a floppy disk 238, a host bus adapter (HBA) interface card 235A operative to connect with a Fibre Channel network 290, a host bus adapter (HBA) interface card 235B operative to connect to a SCSI bus 239, and an optical disk drive 240 operative to receive an optical disk 242. Also included may be a mouse 246 (or other point-and-click device, coupled to bus 212 via serial port 228), a modem 247 (coupled to bus 212 via serial port 230), network interface 248 (coupled directly to bus 212), power manager 250, and battery 252.

Bus 212 allows data communication between central processor 214 and system memory 217, which may include read-only memory (ROM) or flash memory (neither shown), and random access memory (RAM) (not shown), as previously noted. The RAM may be the main memory into which the operating system and application programs may be loaded. The ROM or flash memory can contain, among other code, the Basic Input-Output system (BIOS) which controls basic hardware operation such as the interaction with peripheral components. Applications resident with computer system 200 may be stored on and accessed via a computer readable medium, such as a hard disk drive (e.g., fixed disk 244), an optical drive (e.g., optical drive 240), a floppy disk unit 237, or other storage medium. For example, access point determination module 122, optimal connection duration storage module 124, optimal connection duration determination module 126, and client connection module 128 may be resident in system memory 217.

Storage interface 234, as with the other storage interfaces of computer system 200, can connect to a standard computer readable medium for storage and/or retrieval of information, such as a fixed disk drive 244. Fixed disk drive 244 may be a part of computer system 200 or may be separate and accessed through other interface systems. Modem 247 may provide a direct connection to a remote server via a telephone link or to the Internet via an internet service provider (ISP). Network interface 248 may provide a direct connection to a remote server via a direct network link to the Internet via a POP (point of presence). Network interface 248 may provide such connection using wireless techniques, including digital cellular telephone connection, Cellular Digital Packet Data (CDPD) connection, digital satellite data connection or the like.

Many other devices or subsystems (not shown) may be connected in a similar manner (e.g., document scanners, digital cameras and so on). Conversely, all of the devices shown in FIG. 2 need not be present to practice the present disclosure. The devices and subsystems can be interconnected in different ways from that shown in FIG. 2. Code to implement the present disclosure may be stored in computer-readable storage media such as one or more of system memory 217, fixed disk 244, optical disk 242, or floppy disk 238. Code to implement the present disclosure may also be received via one or more interfaces and stored in memory. The operating system provided on computer system 200 may be MS-DOS®, MS-WINDOWS®, OS/2®, OS X®, UNIX®, Linux®, or another known operating system.

Power manager 250 may monitor a power level of battery 252. Power manager 250 may provide one or more APIs (Application Programming Interfaces) to allow determination of a power level, of a time window remaining prior to shutdown of computer system 200, a power consumption rate, an indicator of whether computer system is on mains (e.g., AC Power) or battery power, and other power related information. According to some embodiments, APIs of power manager 250 may be accessible remotely (e.g., accessible to a remote backup management module via a network connection). According to some embodiments, battery 252 may be an Uninterruptable Power Supply (UPS) located either local to or remote from computer system 200. In such embodiments, power manager 250 may provide information about a power level of an UPS.

Figure 3:
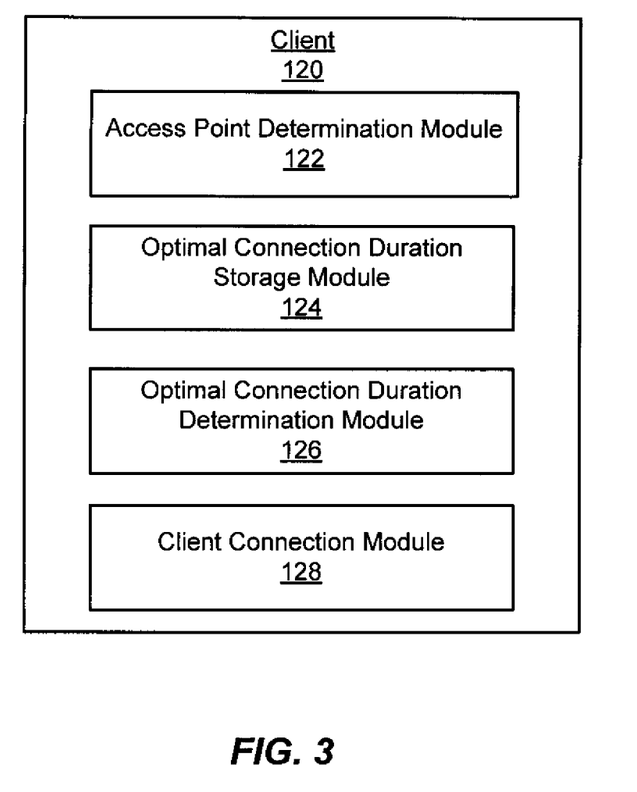
FIG. 3 shows modules of a client in accordance with an embodiment of the present disclosure.

FIG. 3 shows modules of a client 120 in accordance with an embodiment of the present disclosure. As illustrated, the client 120 may contain one or more components including an access point determination module 122, an optimal connection duration storage module 124, an optimal connection duration determination module 126, and a client connection module 128.

The description below describes network elements, computers, and/or components of a system and method for determining an optimal connection duration for a connection between a client and a server across a network that may include one or more modules. As used herein, the term "module" may be understood to refer to computing software, firmware, hardware, and/or various combinations thereof. Modules, however, are not to be interpreted as software which is not implemented on hardware, firmware, or recorded on a processor readable recordable storage medium (i.e., modules are not software per se). The modules may be combined, integrated, separated, and/or duplicated to support various applications. Also, a function described herein as being performed at a particular module may be performed at one or more other modules and/or by one or more other devices instead of or in addition to the function performed at the particular module. Further, the modules may be implemented across multiple devices and/or other components local or remote to one another. Additionally, the modules may be moved from one device and added to another device, and/or may be included in both devices.

Access point determination module 122 may be configured to identify a MAC address associated with a network access point of a network to which a client device (e.g., client 120) is connected. In one embodiment, the access point determination module 122 may identify the MAC address of the network access point when a client device is initially connected to the network.

Optimal connection duration storage module 124 may be configured to store any, or a combination, of one or more MAC addresses, one or more previously determined optimal connection durations, and one or more previously determined optimal keep alive frequencies associated with a client device. For example, the client device may have previously connected to 3 different networks. Accordingly, the optimal connection duration storage module 124 may store a first optimal connection duration, a first optimal keep alive frequency, or a combination of both, that were previously determined while the client device was connected to the first network. In addition, the optimal connection duration storage module 124 may store a second optimal connection duration, a second optimal keep alive frequency, or a combination of both, that were previously determined while the client device was connected to the second network. Furthermore, the optimal connection duration storage module 124 may store a third optimal connection duration, a third optimal keep alive frequency, or a combination of both, that were previously determined while the client device was connected to the third network.

In one embodiment, each optimal connection duration and optimal keep alive frequency may be associated with a corresponding MAC address of a network access point of a corresponding network. As a result, the optimal connection duration storage module 124 may provide access to one or more optimal connection durations or one or more optimal keep alive frequencies based on a corresponding MAC address.

Optimal connection duration determination module 126 may be configured to determine whether an optimal connection duration or an optimal keep alive frequency has been previously determined for the network to which the client device is connected based on the identified MAC address. If, for example, the MAC address is associated with an optimal connection duration or an optimal keep alive frequency that were previously determined, the optimal connection duration determination module 126 may use the previously determined optimal connection duration or optimal keep alive frequency to maintain a live, persistent connection between the client device and a server across the network. If, however, the MAC address is not associated with an optimal connection duration or an optimal keep alive frequency that were previously determined, the optimal connection duration determination module 126 may initiate a process to determine an optimal connection duration, an optimal keep alive frequency, or a combination of both.

In one embodiment, the optimal connection duration determination module 126 may determine an optimal connection duration by selecting a sever connection time period (e.g., an initial sever connection time period). For example, the optimal connection duration determination module 126 may select an initial sever connection time period of 6 hours. In another example, the optimal connection duration determination module 126 may select an initial sever connection time period of 2 hours. In yet another example, the optimal connection duration determination module 126 may select an initial sever connection time period of 8 hours. In certain embodiments, the initial sever connection time period may be selected based on any, or a combination, of the client device's previous interactions with the network, the client device's previous interactions with similar networks, and design preferences.

The optimal connection duration determination module 126 may then initiate a connection with a server across the network based on the selected sever connection time period. That is, the optimal connection duration determination module 126 may initiate the connection with the server and transmit the selected sever connection time period to the server across the network.

The optimal connection duration determination module 126 may then wait and determine whether a sever connection notification was received from the server within the selected sever connection time period. In certain embodiments, determining whether the sever connection notification was received within the selected sever connection time period may include determining whether the sever connection notification was received within a total time period. The total time period may include a sum of the sever connection time period and a threshold time period (e.g., a 10 minute grace period, a 5 minute grace period). The threshold time period may be selected based on any, or a combination, of one or more characteristics associated with the network, one or more characteristics associated with the server, one or more characteristics associated with the client device, one or more characteristics associated with the traffic flowing across the network, and design preferences.

In one embodiment, a sever connection notification may include a notification to the client device that the server is preparing to sever the connection between the client device and the server. In another embodiment, a sever connection notification may include an instruction to the client device to initiate a new connection between the client device and the server.

If, for example, the optimal connection duration determination module 126 determines that a sever connection notification was received from the server within the sever connection time period (i.e., the connection is still live), the sever connection time period may be increased (e.g., increase the sever connection time period from 6 hours to 9 hours) and a new connection between the client device and the server may be initiated. If, however, the optimal connection duration determination module 126 determines that a sever connection notification was not received from the server within the sever connection time period (i.e., the connection is not still live), the sever connection time period may be decreased (e.g., decrease the sever connection time period from 6 hours to 3 hours) and a new connection between the client device and the server may be initiated. The optimal connection duration determination module 126 may continue adjusting the sever connection time period (e.g., by increasing and decreasing the sever connection time period) until the optimal connection duration is determined. The optimal connection duration may be stored in the optimal connection duration storage module 124 according to the corresponding MAC address once determined.

In another embodiment, the optimal connection duration determination module 126 may determine an optimal keep alive frequency by selecting an initial keep alive frequency (e.g., 30 minutes). For example, the optimal connection duration determination module 126 may select an initial keep alive frequency of 30 minutes. In another example, the optimal connection duration determination module 126 may select an initial keep alive frequency of 1 hour. In yet another example, the optimal connection duration determination module 126 may select an initial keep alive frequency of 15 minutes. In certain embodiments, the initial keep alive frequency may be selected based on any, or a combination, of the client device's previous interactions with the network, the client device's previous interactions with similar networks, and design preferences.

The optimal connection duration determination module 126 may then transmit one or more keep alive messages based on the selected keep alive frequency and determine whether a sever connection notification was received from the server within the sever connection time period. If, for example, the optimal connection duration determination module 126 receives a sever connection notification within the sever connection time period (i.e., the connection is still live), the keep alive frequency may be decreased (e.g., decrease the keep alive frequency from 30 minutes to 1 hour) and a new connection between the client device and the server may be initiated. If, however, the optimal connection duration determination module 126 does not receive a sever connection notification within the sever connection time period (i.e., the connection is not still live), the keep alive frequency may be increased (e.g., increase the keep alive frequency from 30 minutes to 15 minutes) and a new connection between the client device and the server may be initiated. The optimal connection duration determination module 126 may continue adjusting the keep alive frequency until the optimal keep alive frequency is determined. The optimal keep alive frequency may be stored in the optimal connection duration storage module 124 according to the corresponding MAC address once determined.

The client connection module 128 may be configured to initiate a new connection between a client device and a server based on the optimal connection duration, the optimal keep alive frequency, or a combination of both. Accordingly, the client connection module 128 may maintain the appearance of an indefinitely persistent connection between the client device and the server by initiating a new connection with the server at the end of the optimal connection duration.

Figure 4:
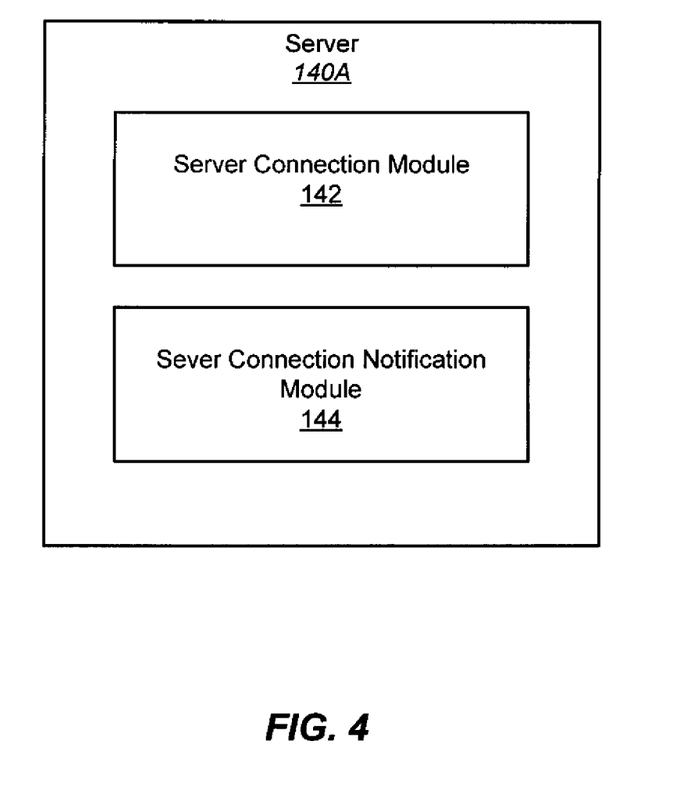
FIG. 4 shows modules of a server in accordance with an embodiment of the present disclosure.

FIG. 4 shows modules of a server 140A in accordance with an embodiment of the present disclosure. As illustrated, the server 140A may contain one or more components including an server connection module 142 and a sever connection notification module 144.

The description below describes network elements, computers, and/or components of a system and method for determining an optimal connection duration for a connection between a client and a server across a network that may include one or more modules. As used herein, the term "module" may be understood to refer to computing software, firmware, hardware, and/or various combinations thereof. Modules, however, are not to be interpreted as software which is not implemented on hardware, firmware, or recorded on a processor readable recordable storage medium (i.e., modules are not software per se). The modules may be combined, integrated, separated, and/or duplicated to support various applications. Also, a function described herein as being performed at a particular module may be performed at one or more other modules and/or by one or more other devices instead of or in addition to the function performed at the particular module. Further, the modules may be implemented across multiple devices and/or other components local or remote to one another. Additionally, the modules may be moved from one device and added to another device, and/or may be included in both devices.

Server connection module 142 may be configured to receive a sever connection time period from a client device. In one embodiment, the server connection module 142 may receive the sever connection time period from the client device while the client device is initiating a new connection with a server (e.g., server 140A).

Sever connection notification module 144 may be configured to determine whether a sever connection time period has elapsed since the initiation of a connection between a client device and a server. If, for example, the sever connection notification module 144 determines that the sever connection time period has elapsed, a sever connection notification may be created and transmitted to the client device. After the sever connection notification is transmitted, the sever connection notification module 144 may gracefully sever the connection between the client device and the server.

Figure 5A:
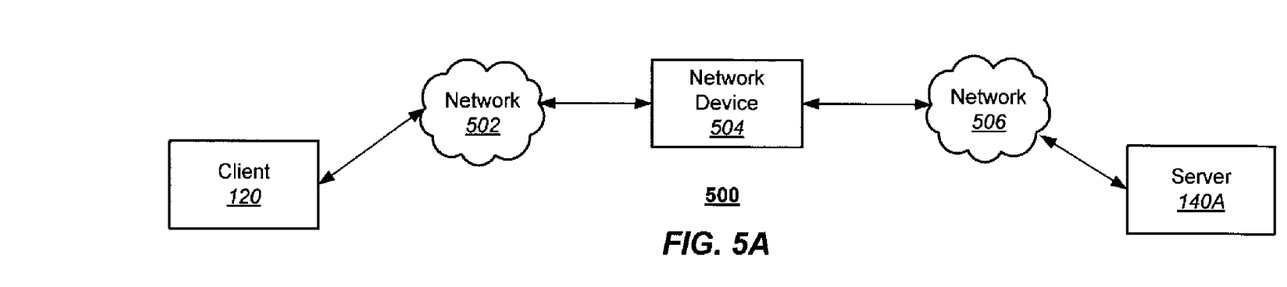
FIG. 5A shows a connection between a client and a server across a network in accordance with an embodiment of the present disclosure.

FIG. 5A shows a connection 500 between a client and a server across a network in accordance with an embodiment of the present disclosure. As illustrated in FIG. 5A, a client device (e.g., client 120) may be connected to a server (e.g., server 140A) via network 502, network device 504 (e.g., a firewall), and network 506.

Figure 5B:
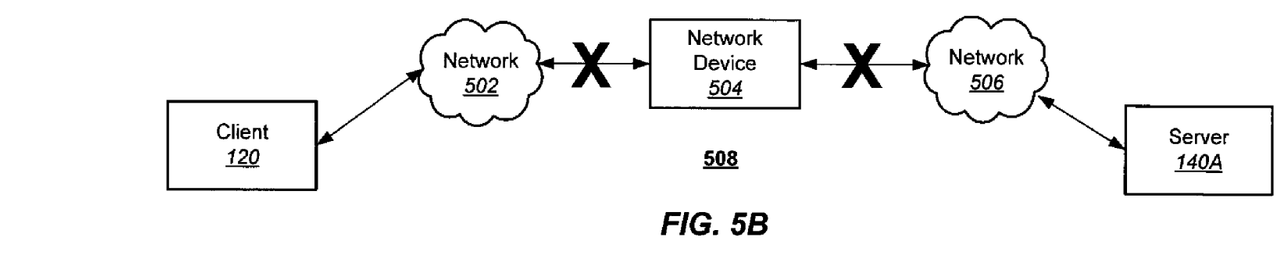
FIG. 5B shows a network device terminating a connection between a client and a server in accordance with an embodiment of the present disclosure.

FIG. 5B shows a network device terminating a connection 508 between a client and a server in accordance with an embodiment of the present disclosure. As illustrated in FIG. 5B, network device 504 located between the client 120 and the server 140A may terminate the connection 508 between the client 120 and the server 140A without warning or notification (e.g., ungracefully) for various reasons. For example, network device 504 may terminate the connection 508 between client 120 and server 140A based on a determination that the machines have been connected and silent (e.g., sending low or no traffic) for too long. In another example, network device 504 may terminate the connection 508 between client 120 and server 140A to conserve the memory of network device 504.

Figure 5C:
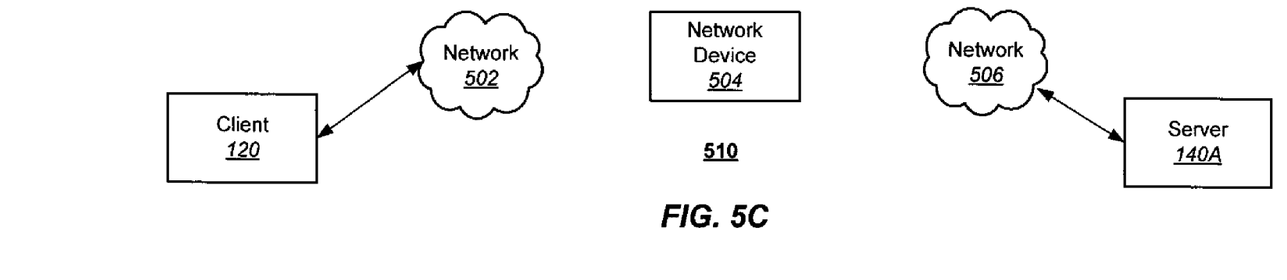
FIG. 5C shows the result of a terminated connection between a client and a server in accordance with an embodiment of the present disclosure.

FIG. 5C shows the result of a terminated connection 510 between a client and a server in accordance with an embodiment of the present disclosure. As illustrated in FIG. 5C, the server 140A may be unable to communicate with the client 120 as a result of the ungraceful termination of the connection between the client 120 and the server 140A. Accordingly, the client 120 will not receive messages from the server 140A and the server 140A will not receive messages from the client 120.

The embodiments described herein prevent such an event from occurring by determining an optimal connection duration, an optimal keep alive frequency, or a combination of both. That is, based on the optimal connection duration, optimal keep alive frequency, or a combination of both, the connection duration system described above may maintain the appearance of an indefinitely persistent connection by initiating a new connection between a client and a server at the end of the optimal connection duration.

Figure 6:
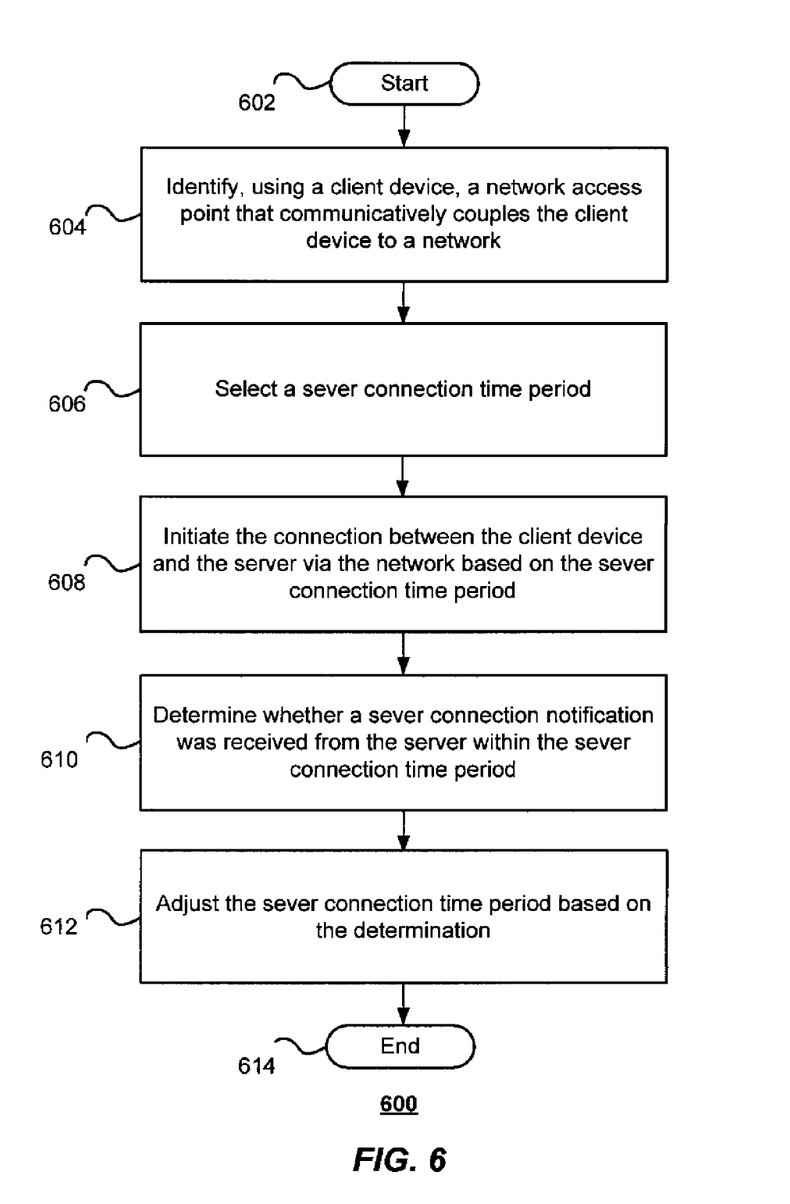
FIG. 6 depicts a method for determining an optimal connection duration for a connection between a client and a server across a network in accordance with an embodiment of the present disclosure.

FIG. 6 depicts a method for determining an optimal connection duration for a connection between a client and a server across a network in accordance with an embodiment of the present disclosure. The method 600 may begin at block 602.

At block 604, a network access point communicatively coupling a client device to a network may be identified using the client device. In certain embodiments, the access point determination module 122 may identify a network access point when a client device initially connects to a network. The network access point may be identified by identifying the MAC address associated with the network access point.

At block 606, a sever connection time period may be selected. In certain embodiments, the optimal connection duration determination module 126 may select an initial sever connection time period. For example, the optimal connection duration determination module 126 may select an initial sever connection time period of 6 hours. In another example, the optimal connection duration determination module 126 may select an initial sever connection time period of 2 hours. In yet another example, the optimal connection duration determination module 126 may select an initial sever connection time period of 8 hours. In certain embodiments, the initial sever connection time period may be selected based on any, or a combination, of the client device's previous interactions with the network, the client device's previous interactions with similar networks, and design preferences.

At block 608, a connection between the client device and the server may be initiated via the network based on the sever connection time period. That is, the optimal connection duration determination module 126 may initiate the connection between the client device and the server and transmit the selected sever connection time period to the server across the network.

At block 610, whether a sever connection notification was received from the server within the sever connection time period may be determined.

At block 612, the sever connection time period may be adjusted based on the determination. In certain embodiments, the sever connection time period may be adjusted by increasing the sever connection time period based on the determination that the sever connection notification was received from the server within the sever connection time period. In other embodiments, the sever connection time period may be adjusted by decreasing the sever connection time period based on the determination that the sever connection notification was not received from the server within the sever connection time period.

At block 614, the method 600 may end.

At this point it should be noted that determining an optimal connection duration for a connection between a client and a server across a network in accordance with the present disclosure as described above may involve the processing of input data and the generation of output data to some extent. This input data processing and output data generation may be implemented in hardware or software. For example, specific electronic components may be employed in an optimal connection duration determination module or similar or related circuitry for implementing the functions associated with determining an optimal connection duration for a connection between a client and a server across a network in accordance with the present disclosure as described above. Alternatively, one or more processors operating in accordance with instructions may implement the functions associated with determining an optimal connection duration for a connection between a client and a server across a network in accordance with the present disclosure as described above. If such is the case, it is within the scope of the present disclosure that such instructions may be stored on one or more processor readable storage media (e.g., a magnetic disk or other storage medium), or transmitted to one or more processors via one or more signals embodied in one or more carrier waves.

The present disclosure is not to be limited in scope by the specific embodiments described herein. Indeed, other various embodiments of and modifications to the present disclosure, in addition to those described herein, will be apparent to those of ordinary skill in the art from the foregoing description and accompanying drawings. Thus, such other embodiments and modifications are intended to fall within the scope of the present disclosure. Further, although the present disclosure has been described herein in the context of at least one particular implementation in at least one particular environment for at least one particular purpose, those of ordinary skill in the art will recognize that its usefulness is not limited thereto and that the present disclosure may be beneficially implemented in any number of environments for any number of purposes. Accordingly, the claims set forth below should be construed in view of the full breadth and spirit of the present disclosure as described herein.

The invention claimed is:

1. A method of determining an optimal connection duration for a connection between a client device and a server across a network comprising:
 identifying, using the client device, a network access point that communicatively couples the client device to a network;
 selecting a sever connection time period;
 initiating the connection between the client device and the server via the network based on the sever connection time period;
 determining whether a sever connection notification was received from the server within the sever connection time period, wherein the sever connection notification indicates to the client device that the connection between the client device and the server is still live, wherein the sever connection notification is further configured to notify the client device that the server is preparing to sever the connection between the client device and the server; and
 adjusting the sever connection time period based on the determination.

2. The method of claim 1, wherein identifying the network access point comprises identifying a Media Access Control (MAC) address associated with the network access point.

3. The method of claim 1, wherein the sever connection time period indicates an amount of time the server should wait before gracefully severing the connection between the client device and the server.

4. The method of claim 1, wherein initiating the connection between the client device and the server comprises transmitting the sever connection time period to the server via the network.

5. The method of claim 1, wherein the sever connection notification is further configured to instruct the client device to initiate a new connection between the client device and the server.

6. The method of claim 1, further comprising determining whether the sever connection notification was received within a total time period that comprises a sum of the sever connection time period and a threshold time period.

7. The method of claim 1, wherein adjusting the sever connection time period comprises increasing the sever connection time period based on the determination that the sever connection notification was received from the server within the sever connection time period.

8. The method of claim 1, wherein adjusting the sever connection time period comprises decreasing the sever connection time period based on the determination that the sever connection notification was not received from the server within the sever connection time period.

9. The method of claim 1, further comprising adjusting the sever connection time period until the optimal connection duration is determined.

10. The method of claim 1, further comprising selecting a keep alive frequency.

11. The method of claim 1, further comprising transmitting one or more keep alive messages based on the keep alive frequency.

12. The method of claim 10, further comprising adjusting the keep alive frequency until an optimal keep alive frequency is determined.

13. An article of manufacture for determining an optimal connection duration for a connection between a client device and a server across a network, the article of manufacture comprising:
- at least one non-transitory processor readable medium; and
- instructions stored on the at least one medium;
- wherein the instructions are configured to be readable from the at least one medium by at least one processor and thereby cause the at least one processor to operate so as to:
  - identify a network access point that communicatively couples the client device to a network;
  - select a sever connection time period;
  - initiate the connection between the client device and the server via the network based on the sever connection time period;
  - determine whether a sever connection notification was received from the server within the sever connection time period, wherein the sever connection notification indicates to the client device that the connection between the client device and the server is still live, wherein the sever connection notification is further configured to notify the client device that the server is preparing to sever the connection between the client device and the server; and
  - adjust the sever connection time period based on the determination.

14. A system for determining an optimal connection duration for a connection between a client device and a server across a network comprising:
- one or more computer processors configured to:
  - identify a network access point that communicatively couples the client device to a network;
  - select a sever connection time period;
  - initiate the connection between the client device and the server via the network based on the sever connection time period;
  - determine whether a sever connection notification was received from the server within the sever connection time period, wherein the sever connection notification indicates to the client device that the connection between the client device and the server is still live, wherein the sever connection notification is further configured to notify the client device that the server is preparing to sever the connection between the client device and the server; and
  - adjust the sever connection time period based on the determination; and
- at least one memory, coupled to the one or more computer processors, configured to provide the one or more computer processors with instructions.

15. The system of claim 14, wherein the one or more processors are configured to identify the network access point by identifying a MAC address associated with the network access point.

16. The system of claim 14, wherein the sever connection time period indicates an amount of time the server should wait before gracefully severing the connection between the client device and the server.

17. The system of claim 14, wherein the one or more processors are configured to initiate the connection between the client device and the server by transmitting the sever connection time period to the server via the network.

18. The system of claim 14, wherein the one or more processors are configured to adjust the sever connection time period by increasing the sever connection time period based on the determination that the sever connection notification was received from the server within the sever connection time period.

19. The system of claim 14, wherein the one or more processors are configured to adjust the sever connection time period by decreasing the sever connection time period based on the determination that the sever connection notification was not received from the server within the sever connection time period.

20. A method of determining an optimal connection duration for a connection between a client device and a server across a network comprising:
- identifying, using the client device, a network access point that communicatively couples the client device to a network;
- selecting a sever connection time period;
- initiating the connection between the client device and the server via the network based on the sever connection time period;
- determining whether a sever connection notification was received from the server within the sever connection time period, wherein the sever connection notification indicates to the client device that the connection between the client device and the server is still live; and
- adjusting the sever connection time period based on the determination wherein the sever connection time period indicates an amount of time the server should wait before gracefully severing the connection between the client device and the server.

\* \* \* \* \*